United States Patent
Berbee et al.

(10) Patent No.: US 9,228,036 B2
(45) Date of Patent: Jan. 5, 2016

(54) LOW DENSITY ETHYLENE-BASED POLYMERS WITH BROAD MOLECULAR WEIGHT DISTRIBUTIONS AND LOW EXTRACTABLES

(71) Applicants: Otto J. Berbee, Hulst (NL); Cornelis F. den Doelder, Terneuzen (NL); Stefan Hinrichs, Wondelgem (BE); Teresa P. Karjala, Lake Jackson, TX (US)

(72) Inventors: Otto J. Berbee, Hulst (NL); Cornelis F. den Doelder, Terneuzen (NL); Stefan Hinrichs, Wondelgem (BE); Teresa P. Karjala, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/354,054

(22) PCT Filed: Nov. 9, 2012

(86) PCT No.: PCT/US2012/064284
§ 371 (c)(1),
(2) Date: Apr. 24, 2014

(87) PCT Pub. No.: WO2013/078018
PCT Pub. Date: May 30, 2013

(65) Prior Publication Data
US 2014/0316094 A1 Oct. 23, 2014

Related U.S. Application Data

(60) Provisional application No. 61/563,186, filed on Nov. 23, 2011.

(51) Int. Cl.
| | | |
|---|---|---|
| C08F 10/02 | (2006.01) |
| C08F 110/02 | (2006.01) |
| C08F 210/02 | (2006.01) |
| C09D 123/06 | (2006.01) |
| C09D 123/08 | (2006.01) |
| C08F 218/08 | (2006.01) |
| C08F 220/18 | (2006.01) |

(52) U.S. Cl.
CPC .............. *C08F 110/02* (2013.01); *C08F 210/02* (2013.01); *C08F 218/08* (2013.01); *C08F 220/18* (2013.01); *C09D 123/06* (2013.01); *C09D 123/0815* (2013.01)

(58) Field of Classification Search
CPC .................................. C08L 23/08; C08F 10/02
USPC ........................................................ 526/352
See application file for complete search history.

(56) References Cited

U.S. PATENT DOCUMENTS

| | | |
|---|---|---|
| 2,153,553 A | 4/1939 | Fawcett et al. |
| 2,396,791 A | 3/1946 | Krase et al. |
| 2,897,183 A | 7/1959 | Christl et al. |
| 3,334,081 A | 8/1967 | Madgwick et al. |
| 3,657,212 A | 4/1972 | Steigerwald et al. |
| 3,917,577 A | 11/1975 | Trieschmann et al. |
| 4,287,262 A | 9/1981 | Engelhard et al. |
| 6,569,962 B1 | 5/2003 | Zschoch et al. |
| 6,844,408 B2 | 1/2005 | Gonioukh et al. |
| 6,949,611 B2 | 9/2005 | Wittkowski et al. |
| 7,968,659 B2* | 6/2011 | Chai .............................. 526/160 |
| 8,242,220 B2* | 8/2012 | Chai .............................. 526/126 |
| 2003/0114607 A1 | 6/2003 | Donck |
| 2006/0177675 A1* | 8/2006 | Lehtinen et al. .............. 428/461 |
| 2007/0092704 A1 | 4/2007 | Patel et al. |
| 2007/0225445 A1 | 9/2007 | Nguyen et al. |
| 2008/0139749 A1* | 6/2008 | Lehtinen et al. .............. 525/240 |
| 2009/0234082 A1 | 9/2009 | Neilen et al. |
| 2010/0087606 A1 | 4/2010 | Karjala et al. |

FOREIGN PATENT DOCUMENTS

| | | |
|---|---|---|
| DE | 2107945 A1 | 8/1972 |
| DE | 120200 A1 | 6/1976 |
| DE | 276598 A3 | 3/1990 |
| EP | 0 069 806 A1 | 1/1983 |
| EP | 0792318 A1 | 9/1997 |
| EP | 0928797 A1 | 7/1999 |
| EP | 1777238 A1 | 4/2007 |
| EP | 2077296 A1 | 7/2009 |
| EP | 2123707 B1 | 10/2010 |
| GB | 1101763 A | 1/1968 |

(Continued)

OTHER PUBLICATIONS

International Search Report and Written Opinion for PCT/US2012/064284, Date of Mailing Jul. 1, 2013, 13 pages.

(Continued)

*Primary Examiner* — Rip A Lee

(57) ABSTRACT

The invention provides an ethylene-based polymer comprising the following properties: a) a melt index (I2)>2.0 dg/min; b) a Mw(abs) versus I2 relationship: Mw(abs)<A+B(I2), where A=2.40×10⁵ g/mole, and B=−8.00×10³ (g/mole)/(dg/min); and c) a G' versus I2 relationship: G'>C+D(I2), where C=127.5 Pa, and D=−1.25 Pa/(dg/min). The invention also provides an ethylene-based polymer comprising the following properties: a) a melt index (I2)>2.0 dg/min; b) a G' versus I2 relationship: G'>C+D(I2), where C=127.5 Pa, and D=−1.25 Pa/(dg/min) c) a chloroform extractable (Clext) versus G' relationship: Clext.<E+FG', where E=0.20 wt %, and F=0.060 wt %/Pa; and d) a "weight fraction (w) of molecular weight greater than 10⁶ g/mole, based on the total weight of polymer, and as determined by GPC(abs)," that meets the following relationship: w<I−J(I2), where I=0.080, and J=−4.00×10⁻³ min/dg.

16 Claims, 3 Drawing Sheets

(56) References Cited

FOREIGN PATENT DOCUMENTS

| | | |
|---|---|---|
| GB | 1196183 A | 6/1970 |
| WO | 2006/094723 A1 | 9/2006 |
| WO | 2006/096504 | 9/2006 |
| WO | 2007/110127 A1 | 10/2007 |
| WO | 2008/112373 A1 | 9/2008 |
| WO | 2011/075465 A1 | 6/2011 |
| WO | 2013/059042 A1 | 4/2013 |

OTHER PUBLICATIONS

International Preliminary Report on Patentabilitity for PCT/US2012/064284, Date of Issuance May 27, 2014, 8 pages.

* cited by examiner

LOW DENSITY ETHYLENE-BASED POLYMERS WITH BROAD MOLECULAR WEIGHT DISTRIBUTIONS AND LOW EXTRACTABLES

REFERENCE TO RELATED APPLICATIONS

The present application claims the benefit of U.S. Provisional Application No. 61/563,186, filed Nov. 23, 2011.

BACKGROUND

Resins for extrusion coating on paper, board, aluminum etc, are designed with broad MWD (molecular weight distribution) and low extractables. In extrusion coating application the polymer is processed at high temperature conditions, typically above 280° C. and below 350° C. Broad MWD (high molecular weight fraction) is necessary for good processability during coating (neck-in and draw down balance), while low extractables are needed for low smoke formation during coating, at high temperature conditions, and or for food contact compliance. Broad MWD LDPE (low density polyethylene) is made up of low and high molecular weight polymer molecules, and an average molecular weight will determine the melt index. The extractable fraction increases with an increasing fraction of low molecular weight molecules, and is enhanced by increasing short chain branching frequency at low molecular weight molecules. In view of this combination of features, there is typically a trade-off between coating performance and extractable level.

Typically LDPE resins with broad MWD are made on autoclave or combination of autoclave and tube reactors. Broad MWD resins can be achieved in autoclave reactor systems by promoting long chain branching and through the inherent residence time distribution by which molecules will undergo shorter (low molecular weight) or longer (high molecular weight) growth paths.

The autoclave and tubular reactor systems differ from each other in respect to residence time distribution, typically uniform for tubular and dispersed for autoclave reactor zones, while polymerization conditions like temperature, pressure and polymer concentrations vary widely in tubular reactor systems and are uniform or are less differentiated for autoclave reactor systems. The uniform residence time in tubular reactor conditions leads to narrower MWD, therefore broad MWD can only be achieved in tubular reactors by applying extremely differentiated polymerization conditions. These extremely differentiated polymerization conditions lead to higher extractable level by formation of polymer molecules with lower molecular weight and/or increased short chain branching level in the low molecular weight fraction. However, an autoclave process typically operates at lower conversion levels, and is more capital/energy intensive than a tubular process.

Thus, there is a need for new ethylene-based polymers with broad MWD and low extractables, suitable for extrusion coating application, and which can be made in a tubular process. There is a further need for such polymers that can be prepared without any chemical modification, for instance the use of cross-linking agents in reactors, separators, extruders, etc., or the use of blending operations.

International Publication No. WO 2007/110127 discloses an extrusion coating composition comprising an ethylene copolymer. The ethylene copolymer is obtained by a polymerization that takes place in a tubular reactor at a peak temperature between 300° C. and 350° C. The comonomer is a bifunctional α,ω-alkadiene, which is capable of acting as a crosslinking agent.

International Publication No. WO 2006/094723 discloses a process for the preparation of a copolymer of ethylene and a monomer copolymerizable therewith. The polymerization takes place in a tubular reactor at a peak temperature between 290° C. and 350° C. The comonomer is a di- or higher functional (meth) acrylate, and the comonomer is used in an amount between 0.008 mol % and 0.200 mol %, relative to the amount of ethylene copolymer. The di- or higher functional (meth)acrylate is capable of acting as a crosslinking agent.

European Patent EP 0928797B1 discloses an ethylene homo or copolymer having a density of between 0.923 and 0.935 g/cc, and a molecular weight distribution Mw/Mn between 3 and 10, and comprising from 0.10 to 0.50 wt % of units derived from a carbonyl group containing compound, based on the total weight of the homopolymer or copolymer.

DD276598A3 (English Translation) discloses a process for adjusting and regulating the input gas streams for multizone tubular reactors, with at least two side input streams, for the production of ethylene polymers, by free-radical bulk polymerization. The polymerization takes place at pressures above 80 MPa, temperatures from 373 to 623K, and in the presence of 10 to 50 ppm of oxygen, as polymerization initiator.

U.S. Pat. No. 3,334,081 discloses a continuous process for the production of polymers of ethylene as carried out in a tubular reactor, whereby the polymer is obtained at a higher conversion rate. In one embodiment, this patent discloses a continuous process for the polymerization of ethylene in a tubular reactor at a pressure of at least about 15,000 p.s.i.g., and a temperature from about 90° C. to about 350° C., in the presence of a free radical initiator.

U.S. Pat. No. 3,657,212 discloses a production of ethylene homopolymers having a specific density, by polymerization of ethylene, under the action of organic peroxides and oxygen as free-radical-generating polymerization initiators, and of polymerization modifiers, at elevated temperature and superatmospheric pressure, in a tubular reactor having two successive reaction zones. A mixture of ethylene, polymerization initiator, and polymerization modifier are introduced continuously at the beginning of each reaction zone. The ethylene homopolymers have a broad molecular weight distribution, and are said to be practically devoid of very high molecular weight constituents.

DD120200 (English Translation) discloses a process for producing homopolymers of ethylene with a bulk density of 0.912 to 0.922 g/cc, in tubular reactors, by polymerization of ethylene with free-radical forming initiators. The polymerization is carried out in the absence of chain regulators, and at maximum reactor temperatures of 250 to 340° C., and at pressures of 1000 to 2000 atm, and with multifunctional peroxides.

CA2541180 discloses polymer blends composed of from 25 to 75 wt % homopolymer produced in a tubular reactor, and 75 to 25 wt % of ethylene homopolymer in a high pressure autoclave reactor, provided that each homopolymer is removed from the reaction zone prior to being blended together. The blends so formed are said to have a good combination of neck-in and adhesion properties.

Two-zone tubular reactor systems, commonly used in the above art, lead to polymers with either too narrow MWD or too high extractable level (also see LDPE 160C in Table 4, which is also produced in two-zoned tubular reactor). Achieving broad MWD resins with these reactor systems typically require extremely high peak temperatures and/or low reactor inlet pressures, leading to formation of lower molecular weight material with increased short chain branching level, which leads to high extractables.

Additional polymerizations and/or resins are described in the following: U.S. Pat. Nos. 2,153,553; 2,897,183; 2,396,791; 3,917,577; 4,287,262; 6,569,962; 6,844,408; 6,949,611; U.S. Publication Nos. 2007/0225445; 2003/0114607; US2009/0234082; International Publication Nos. WO 2012/044504; WO 2011/075465; WO 2008/112373; WO 2006/096504; WO 2007/110127; GB1101763; GB1196183; DE2107945 (Abstract); EP0069806A1; EP1777238B1; EP0792318B1; EP2123707A1; and J. Bosch, "The Introduction of Tubular LDPE to the Extrusion Coating Market and the Specifics of the Product," 12$^{th}$ TAPPI European PLACE conference, 2009, 1-20.

Conventional tubular polymerization processes of the art typically produce broad MWD polymers with high levels of extractables. Thus, there remains a need for new ethylene-based polymers, such as LDPE resins, with broad MWD and low extractables. These needs and others have been met by the following invention.

SUMMARY OF INVENTION

The invention provides an ethylene-based polymer comprising the following properties:
 a) a melt index (I2)≥2.0 dg/min;
 b) a Mw(abs) versus I2 relationship: Mw(abs)<A+B(I2), where A=2.40×10$^5$ g/mole, and B=−8.00×10$^3$ (g/mole)/(dg/min); and
 c) a G' versus I2 relationship: G'≥C+D(I2), where C=127.5 Pa, and D=−1.25 Pa/(dg/min).

The invention also provides an ethylene-based polymer comprising the following properties:
 a) a melt index (I2)≥2.0 dg/min;
 b) a G' versus I2 relationship: G'≥C+D(I2), where C=127.5 Pa, and D=−1.25 Pa/(dg/min)
 c) a chloroform extractable (Clext) versus G' relationship: Clext.≤E+FG', where E=0.20 wt %, and F=0.060 wt %/Pa; and
 d) a "weight fraction (w) of molecular weight greater than 10$^6$ g/mole, based on the total weight of polymer, and as determined by GPC(abs)," that meets the following relationship: w<I+J(I2), where I=0.080, and J=−4.00×10$^{-3}$ min/dg.

BRIEF DESCRIPTION OF THE DRAWINGS

As seen in FIG. 1, the notations are as follows: fresh ethylene is fed through line 1; discharge of Primary A is sent through line 2; discharge of Primary B is sent through line 3; 4 and 5 are each a line feed to the Hyper compressor; fresh CTA is fed through each of lines 6 and 7; 8 is a line feed to feed lines 20 and 21, each to the side of the reactor; 9 is a line feed from the Hyper compressor to the front of the reactor; 10 is a line feed from the reactor to the HPS (High Pressure Separator); 11 is a line feed from the HPS to the LPS (Low Pressure Separator); 12 is a discharge line from the LPS; 13 is a line feed from the LPS to the Booster; 14 is a discharge feed from the Booster; 15 is a recycle feed line from the HPS to lines 16 and 17; 16 is a purge line; 17 is a recycle line; 18 and 19 are recycled lines to the Hyper compressor.

As seen in FIG. 2, the notations are as follows: fresh ethylene is fed through line 1; discharge of Primary A is sent through line 2; discharge of Primary B is sent through line 3; 4 and 5 are each a line feed to the Hyper compressor; fresh CTA is fed through each of lines 6 and 7; 8 is a line feed to feed lines 20 and 21, each to the side of the reactor; 9 is a line feed from the Hyper compressor to the front of the reactor; 10 is a line feed from the reactor to the HPS (High Pressure Separator); 11 is a line feed from the HPS to the LPS (Low Pressure Separator); 12 is a discharge line from the LPS; 13 is a line feed from the LPS to the Booster; 14 is a discharge feed from the Booster; 15 is a recycle feed line from the HPS to lines 16 and 17; 16 is a purge line; 17 is a recycle line; 18 and 19 are recycled lines to the Hyper compressor.

DETAILED DESCRIPTION

Figure 1:
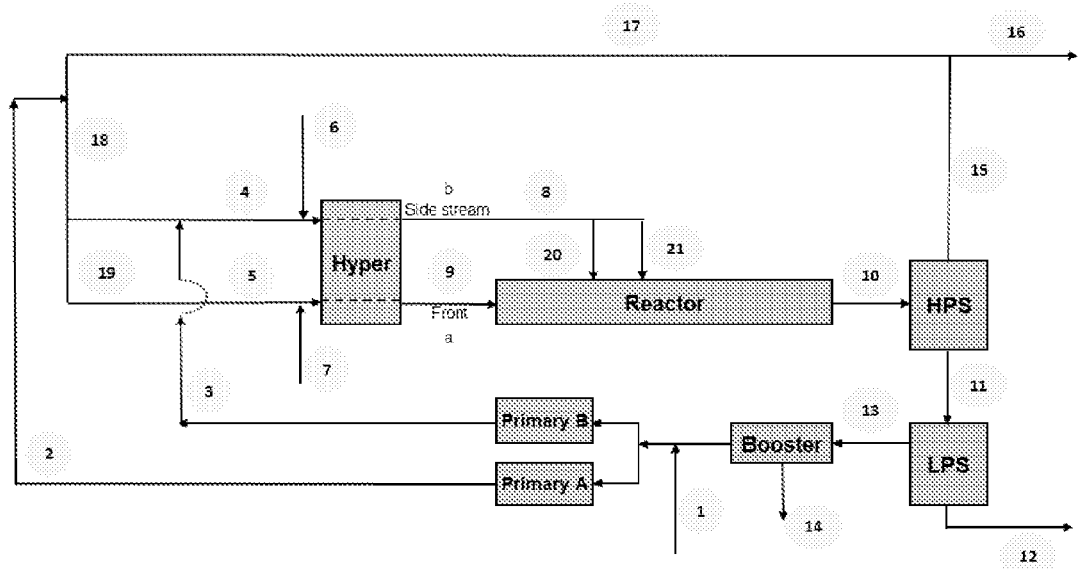
FIG. 1 is a schematic of a polymerization flow scheme.

As discussed above, in a first aspect, the invention provides an ethylene-based polymer comprising the following properties:
 a) a melt index (I2)≥2.0 dg/min;
 b) a Mw(abs) versus I2 relationship: Mw(abs)<A+B(I2), where A=2.40×10$^5$ g/mole, and B=−8.00×10$^3$ (g/mole)/(dg/min); and
 c) a G' versus I2 relationship: G'≥C+D(I2), where C=127.5 Pa, and D=−1.25 Pa/(dg/min).

In a second aspect, the invention provides an ethylene-based polymer comprising the following properties:
 a) a melt index (I2)≥2.0 dg/min;
 b) a G' versus I2 relationship: G'≥C+D(I2), where C=127.5 Pa, and D=−1.25 Pa/(dg/min)
 c) a chloroform extractable (Clext) versus G' relationship: Clext.≤E+FG', where E=0.20 wt %, and F=0.060 wt %/Pa; and
 d) a "weight fraction (w) of molecular weight greater than 10$^6$ g/mole, based on the total weight of polymer, and as determined by GPC(abs)," that meets the following relationship: w<I+J(I2), where I=0.080, and J=−4.00×10$^{-3}$ min/dg.

The following embodiments apply to both the first and second aspects of the invention, as described above.

The ethylene-based polymer may comprise a combination of two or more embodiments as described herein.

As used herein, the G' value noted above is G' for G"=500 Pa (at 170° C.).

In one embodiment, the ethylene-based polymer further comprises a chloroform extractable (Clext) versus G' relationship: Clext.≤E+FG', where E=0.20 wt %, and F=0.060 wt %/Pa. The chloroform extractable is determined by the standard test method described herein.

In one embodiment, the ethylene-based polymer further comprises a chloroform extractable (Clext) level≤7.8 wt % (wt %=weight percent).

In one embodiment, the polymer has a "weight fraction (w) of molecular weight greater than 10$^6$ g/mole, based on the total weight of polymer, and as determined by GPC(abs)" that meets the following relationship: w<I+J(I2), where I=0.080, and J=−4.00×10$^{-3}$ min/dg.

In one embodiment, the ethylene-based polymer is selected from a polyethylene homopolymer or an ethylene-based interpolymer.

In one embodiment, in the ethylene-based polymer is selected from a polyethylene homopolymer or an ethylene-based copolymer; and wherein the comonomer of the ethylene-based copolymer is selected from vinyl acetate, an alkyl acrylate, CO, acrylic acid, a carboxylic acid-containing comonomer, or a mono olefin, or selected from vinyl acetate, an alkyl acrylate, acrylic acid, or a mono olefin. In a further embodiment, the comonomer is present in an amount from 0.5 to 10 wt % comonomer, based on weight of copolymer.

In one embodiment, the ethylene-based polymer comprises less than 30 mole ppm of a crosslinking agent (able to form a covalent bond or linkage between two polymer molecules) or a comonomer with crosslinking capability (able to form a covalent bond or linkage between two polymer molecules), based on total moles of monomer units in the ethylene-based polymer. In a further embodiment, the ethylene-based polymer comprises less than 30 ppm of a comonomer containing multiple unsaturations or containing an acetylenic functionality.

It is understood that trace amounts of impurities can be incorporated into the polymer structure; for example, low traces acetylenic components (less than 20 mol ppm in polymer) can be present in the ethylene feed according to typical specifications for ethylene (for example, acetylene at a maximum 5 mol ppm in the ethylene supply).

In one embodiment, the ethylene-based polymer comprises less than 10 mole ppm incorporated propylene, based on total moles of monomeric units in the ethylene-based polymer.

Desirably, the inventive ethylene-based polymer has low gels. Thus, the direct addition of crosslinking agents or comonomers with crosslinking capability is not desired in the polymerizations of the inventive ethylene-based polymers described herein.

In one embodiment, the ethylene-based polymer has a n-hexane extractable level≤4.5 wt %. The hexane extractable is determined by the standard test method described herein.

In one embodiment, the polymer has a n-hexane extractable level≤3.7 wt %.

In one embodiment, the ethylene-based polymer is a polyethylene homopolymer.

In one embodiment, the ethylene-based polymer is an ethylene-based copolymer; and wherein the comonomer of the ethylene-based copolymer is selected from vinyl acetate, an alkyl acrylate, CO, acrylic acid, a carboxylic acid-containing comonomer, or a mono olefin. In a further embodiment, the comonomer is selected from vinyl acetate, an alkyl acrylate, acrylic acid, or a mono olefin.

In one embodiment, the comonomer is present in an amount from 0.5 to 10 wt % comonomer, based on weight of copolymer.

In one embodiment, the ethylene-based polymer has a Mw(abs) versus I2 relationship: Mw(abs)≤A+B(I2), where $A=2.30\times10^5$ g/mole, and $B=-8.00\times10^3$ (g/mole)/(dg/min).

In one embodiment, the ethylene-based polymer has a weight average molecular Mw(abs)≤200,000 g/mole.

In one embodiment, the ethylene-based polymer has a weight average molecular weight Mw(abs)≥G+H(I2), where $G=1.60\times10^5$ g/mole, and $H=-8.00\times10^3$ (g/mole)/(dg/min).

In one embodiment, the ethylene-based polymer has a weight average molecular weight Mw(abs)≥G+H(I2), where $G=1.70\times10^5$ g/mole, and $H=-8.00\times10^3$ (g/mole)/(dg/min).

In one embodiment, the ethylene-based polymer has a weight average molecular weight Mw(abs)≥G+H(I2), where $G=1.80\times10^5$ g/mole, and $H=-8.00\times10^3$ (g/mole)/(dg/min).

In one embodiment, the ethylene-based polymer has a weight average molecular Mw(abs)≥140,000 g/mole.

In one embodiment, the ethylene-based polymer has a G' versus I2 relationship: G'≥E+F(I2), where E=130 Pa, and F=−1.25 Pa/(dg/min).

In one embodiment, the ethylene-based polymer has an I2≥2.5 g/10 min.

In one embodiment, the ethylene-based polymer has an I2≥3.0 g/10 min.

In one embodiment, the ethylene-based polymer has an I2≤40 g/10 min.

In one embodiment, the ethylene-based polymer has an I2≤30 g/10 min.

In one embodiment, the ethylene-based polymer has an I2≤20 g/10 min.

In one embodiment, the ethylene-based polymer has an I2≤10 g/10 min.

In one embodiment, the ethylene-based polymer has a G'≥120 Pa.

In one embodiment, the ethylene-based polymer has a density from 0.910 to 0.940 g/cc (1 cc=1 $cm^3$).

In one embodiment, the ethylene-based polymer has a density greater than, or equal to, 0.9185 g/cc, or greater than, or equal to, 0.9190 g/cc.

An inventive ethylene-based polymer may comprise a combination of two or more embodiments as described herein.

The invention also provides a composition comprising an inventive ethylene-based polymer, as described herein.

In one embodiment, the composition comprises greater than, or equal to, 90 weight percent, further greater than, or equal to, 95 weight percent, and further greater than, or equal to, 98 weight percent of an inventive ethylene-based polymer, as described herein.

In one embodiment, the composition has a "neck-in" value≤150 mm, at a temperature=290° C., a coating weight=25 g/$m^2$ and a line speed=300 m/min.

In one embodiment, the composition has a "neck-in" value≤145 mm, at a temperature=290° C., a coating weight=25 g/$m^2$ and a line speed=300 m/min.

In one embodiment, the composition has a "neck-in" value≤140 mm, at a temperature=290° C., a coating weight=25 g/$m^2$ and a line speed=300 m/min.

In one embodiment, the composition further comprises another ethylene-based polymer.

An inventive composition may comprise a combination of two or more embodiments as described herein.

The invention also provides an article comprising at least one component formed from an inventive composition.

In one embodiment, the article is an extrusion coating. In another embodiment, the article is a film.

An inventive article may comprise a combination of two or more embodiments as described herein.

Polymerizations

For a high pressure, free radical initiated polymerization process, two basic types of reactors are known. The first type is an agitated autoclave vessel having one or more reaction zones (the autoclave reactor). The second type is a jacketed tube which has one or more reaction zones (the tubular reactor).

The pressure in each autoclave and tubular reactor zone of the process is typically from 100 to 400, more typically from 120 to 360, and even more typically from 150 to 320 MPa.

The polymerization temperature in each tubular reactor zone of the process is typically from 100 to 400, more typically from 130 to 360, and even more typically from 140 to 330° C.

The polymerization temperature in each autoclave reactor zone of the process is typically from 150 to 300, more typically from 165 to 290, and even more typically from 180 to 280° C. One skilled in the art understands that the temperatures in the autoclave are considerably lower and less differentiated than those of the tubular reactor, and thus, more favorable extractable levels are typically observed in polymers produced in an autoclave-based reactor systems.

The high pressure process of the present invention to produce polyethylene homo or interpolymers having the advantageous properties as found in accordance with the invention, is preferably carried out in a tubular reactor having at least three reaction zones.

Initiators

The process of the present invention is a free radical polymerization process. The type of free radical initiator to be used in the present process is not critical, but preferably one of the initiators applied should allow high temperature operation in the range from 300° C. to 350° C. Free radical initiators that are generally used include organic peroxides, such as peresters, perketals, peroxy ketones, percarbonates and cyclic multifunctional peroxides. These organic peroxy initiators are used in conventional amounts, typically from 0.005 to 0.2 wt %, based on the weight of polymerizable monomers. Peroxides are typically injected as diluted solutions in a suitable solvent, for example, in a hydrocarbon solvent.

Other suitable initiators include azodicarboxylic esters, azodicarboxylic dinitriles and 1,1,2,2-tetramethylethane derivatives, and other components capable of forming free radicals in the desired operating temperature range.

In one embodiment, an initiator is added to at least one reaction zone of the polymerization, and wherein the initiator has a "half-life temperature at one second" greater than 255° C., preferably greater than 260° C. In a further embodiment, such initiators are used at a peak polymerization temperature from 320° C. to 350° C. In a further embodiment, the initiator comprises at least one peroxide group incorporated in a ring structure.

Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Chain Transfer Agents (CTA)

Chain transfer agents or telogens are used to control the melt index in a polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. These agents can be of many different types, from saturated hydrocarbons or unsaturated hydrocarbons to aldehydes, ketones or alcohols. By controlling the concentration of the selected chain transfer agent, one can control the length of polymer chains, and, hence the molecular weight, for example, the number average molecular weight, Mn. The melt flow index (MR or $I_2$) of a polymer, which is related to Mn, is controlled in the same way.

The chain transfer agents used in the process of this invention include, but are not limited to, aliphatic hydrocarbons, such as, for example, pentane, hexane, cyclohexane, propene, pentene or hexane; ketones such as acetone, diethyl ketone or diamyl ketone; aldehydes such as formaldehyde or acetaldehyde; and saturated aliphatic aldehyde alcohols such as methanol, ethanol, propanol or butanol.

A further way to influence the melt-index includes the build up and control, in the ethylene recycle streams, of incoming ethylene impurities, like methane and ethane, peroxide dissociation products, like tert-butanol, acetone, etc., and or solvent components used to dilute the initiators. These ethylene impurities, peroxide dissociation products and/or dilution solvent components can act as chain transfer agents.

Polymers

In one embodiment, the ethylene-based polymers of this invention have a density from 0.914 to 0.940, more typically from 0.916 to 0.930 and even more typically from 0.918 to 0.926, grams per cubic centimeter (g/cc or g/cm³). In one embodiment, the ethylene-based polymers of this invention have a melt index ($I_2$) from 2 to 20, more typically from 2 to 15 and even more typically from 2 to 10, grams per 10 minutes (g/10 min) at 190° C./2.16 kg.

Ethylene-based polymers include LDPE homopolymer, and high pressure copolymers, including ethylene/vinyl acetate (EVA), ethylene ethyl acrylate (EEA), ethylene butyl acrylate (EBA), ethylene acrylic acid (EAA), and ethylene carbon monoxide (ECO). Other suitable comonomers are described in Ehrlich, P.; Mortimer, G. A.; Adv. Polymer Science; Fundamentals of Free-radical Polymerization of Ethylene; Vol. 7, pp.386-448 (1970). In one embodiment, comonomers exclude comonomers capable of crosslinking polymer chains, for instance containing multiple unsaturations or an acetylenic functionality.

Monomer and Comonomers

The term ethylene interpolymer as used in the present description, and the claims, refers to polymers of ethylene and one or more comonomers. Suitable comonomers to be used in the ethylene polymers of the present invention include, but are not limited to, ethylenically unsaturated monomers and especially $C_{3-20}$ alpha-olefins, carbon monoxide, vinyl acetate, and $C_{2-6}$ alkyl acrylates. In one embodiment, the ethylene-based polymer does not contain comonomers capable of crosslinking polymer chains, for instance comonomers containing multiple unsaturations or containing an acetylenic functionality.

Blends

The inventive polymers can be blended with one or more other polymers, such as, but not limited to, linear low density polyethylene (LLDPE); copolymers of ethylene with one or more alpha-olefins, such as, but not limited to, propylene, butene-1, pentene-1,4-methyl-pentene-1, pentene-1, hexene-1 and octene-1; high density polyethylene (HDPE), such as HDPE grades HD 940-970 available from The Dow Chemical Company. The amount of inventive polymer in the blend can vary widely, but typically it is from 10 to 90, or from 15 to 85, or from 20 to 80, weight percent, based on the weight of the polymers in the blend. The LDPE (inventive)/LLDPE blends typically provide good optics, and/or are useful in the preparation of laminations, and/or are useful in such applications as films, extrusion coatings, foams, and wire and cables.

Additives

One or more additives may be added to a composition comprising an inventive polymer. Suitable additives include stabilizers; fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils.

Applications

An inventive composition may be employed in a variety of conventional thermoplastic fabrication processes to produce useful articles, including extrusion coatings; films; and molded articles, such as blow molded, injection molded, or rotomolded articles; foams; wire and cable, fibers, and woven or non-woven fabrics.

DEFINITIONS

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene, based on the weight of the polymer and, optionally, may comprise at least one comonomer.

The term "ethylene-based interpolymer" or "ethylene interpolymer" refers to an interpolymer that comprises a majority of polymerized ethylene, based on the weight of the interpolymer, and comprises at least one comonomer.

The term "ethylene-based copolymer" or "ethylene copolymer" refers to an interpolymer that comprises a majority amount of polymerized ethylene, based on the weight of the copolymer, and only one comonomer (thus, only two monomer types).

The terms "autoclave-based products" or "autoclaved-based polymers," as used herein, refer to polymers prepared in an autoclave, autoclave/autoclave, or autoclaved/tubular reactor combination.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

TEST METHODS

Density: Samples for density measurement are prepared according to ASTM D 1928. Polymer samples are pressed at 190° C. and 30,000 psi for three minutes, and then at 21° C. and 207 MPa for one minute. Measurements are made within one hour of sample pressing using ASTM D792, Method B.

Melt Index: Melt index, or $I_2$, (grams/10 minutes or dg/min) is measured in accordance with ASTM D 1238, Condition 190° C./2.16 kg. $I_{10}$ is measured with ASTM D 1238, Condition 190° C./10 kg.

Triple Detector Gel Permeation Chromatography (TDGPC): High temperature TD-GPC analysis is performed on an ALLIANCE GPCV2000 instrument (Waters Corp.) set at 145° C. The flow rate for the GPC is 1 mL/min. The injection volume is 218.5 μL. The column set consists of four, Mixed-A columns (20-μm particles; 7.5×300 mm; Polymer Laboratories Ltd).

Detection is achieved by using an IR4 detector from PolymerChAR, equipped with a CH-sensor; a Wyatt Technology Dawn DSP Multi-Angle Light Scattering (MALS) detector (Wyatt Technology Corp., Santa Barbara, Calif., USA), equipped with a 30-mW argon-ion laser operating at λ=488 nm; and a Waters three-capillary viscosity detector. The MALS detector is calibrated by measuring the scattering intensity of the TCB solvent. Normalization of the photodiodes is done by injecting SRM 1483, a high density polyethylene with weight-average molecular weight (Mw) of 32,100 and polydispersity (molecular weight distribution) of 1.11. A specific refractive index increment (dn/dc) of −0.104 mL/mg, for polyethylene in 1,2,4-trichlorobenzene (TCB), is used.

The conventional GPC calibration is done with 20 narrow PS standards (Polymer Laboratories Ltd.) with molecular weights in the range 580-7,500,000 g/mol. The polystyrene standard peak molecular weights are converted to polyethylene molecular weights using the following equation:

$$M_{polyethylene} = A \times (M_{polystyrene})^B,$$

with A=0.39, and B=1. The value of A is determined by using a linear high density polyethylene homopolymer (HDPE) with Mw of 115,000 g/mol. The HDPE reference material is also used to calibrate the IR detector and viscometer by assuming 100% mass recovery and an intrinsic viscosity of 1.873 dL/g.

Distilled "Baker Analyzed" grade 1,2,4-trichlorobenzene (J. T. Baker, Deventer, The Netherlands), containing 200 ppm of 2,6-di-tert-butyl-4-methylphenol (Merck, Hohenbrunn, Germany), is used as the solvent for sample preparation, as well as for the 3Det-GPC experiment. HDPE SRM 1483 is obtained from the U.S. National Institute of Standards and Technology (Gaithersburg, Md., USA).

LDPE solutions are prepared by dissolving the samples under gentle stirring for three hours at 160° C. The PS standards are dissolved under the same conditions for 30 minutes. The sample concentration is 1.5 mg/mL, and the polystyrene concentrations are 0.2 mg/mL.

A MALS detector measures the scattered signal from polymers or particles in a sample under different scattering angles θ. The basic light scattering equation (from M. Anderson, B. Wittgren, K.-G. Wahlund, Anal. Chem. 75, 4279 (2003)) can be written as follows:

$$\sqrt{\frac{Kc}{R_\theta}} = \sqrt{\frac{1}{M} + \frac{16\pi^2}{3\lambda^2}\frac{1}{M}R_g^2 \sin^2\left(\frac{\theta}{2}\right)},$$

where $R_\theta$ is the excess Rayleigh ratio, K is an optical constant, which is, among other things, dependent on the specific refractive index increment (dn/dc), c is the concentration of the solute, M is the molecular weight, $R_g$ is the radius of gyration, and λ is the wavelength of the incident light. Calculation of the molecular weight and radius of gyration from the light scattering data require extrapolation to zero angle (see also P. J. Wyatt, Anal. Chim. Acta 272, 1 (1993)). This is done by plotting $(Kc/R_\theta)^{1/2}$ as a function of $\sin^2(\theta/2)$ in the so-called Debye plot. The molecular weight can be calculated from the intercept with the ordinate, and the radius of gyration from initial slope of the curve. The second virial coefficient is assumed to be negligible. The intrinsic viscosity numbers are calculated from both the viscosity and concentration detector signals by taking the ratio of the specific viscosity and the concentration at each elution slice.

ASTRA 4.72 (Wyatt Technology Corp.) software is used to collect the signals from the IR detector, the viscometer, and the MALS detector, and to run the calculations.

The calculated molecular weights, e.g. the absolute weight average molecular weight Mw(abs), and absolute molecular weight distributions (e.g., Mw(abs)/Mn(abs)) are obtained using a light scattering constant derived from one or more of the polyethylene standards mentioned and a refractive index concentration coefficient, do/dc, of 0.104. Generally, the mass detector response and the light scattering constant should be determined from a linear standard with a molecular weight in excess of about 50,000 Daltons. The viscometer calibration can be accomplished using the methods described by the manufacturer, or alternatively, by using the published values of suitable linear standards such as Standard Reference Materials (SRM) 1475a, 1482a, 1483, or 1484a. The chromatographic concentrations are assumed low enough to eliminate addressing $2^{nd}$ virial coefficient effects (concentration effects on molecular weight).

The obtained MWD(abs) curve from TD-GPC is summarized with three characteristic parameters: the absolute weight average molecular weight Mw(abs), the absolute number average molecular weight Mn(abs), and w, where w is defined as "weight fraction of molecular weight greater than $10^6$ g/mole, based on the total weight of polymer, and as determined by GPC(abs)."

Figure 6:
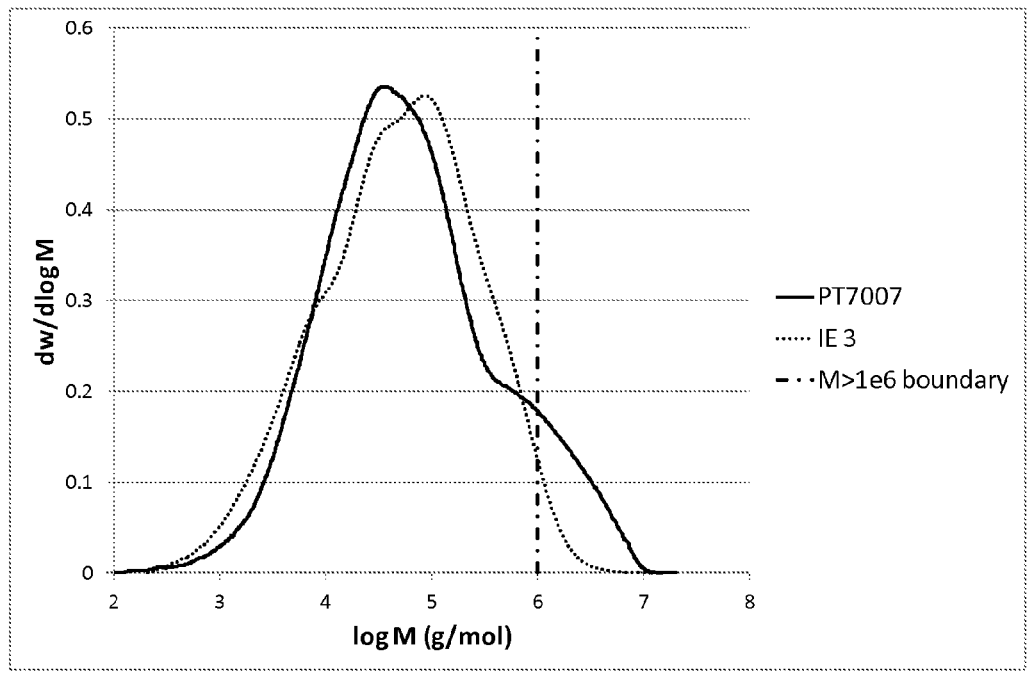
FIG. 6 depicts GPC chromatograms for an inventive LDPE and comparative LDPE.

FIG. 6 shows the MWD(abs) for comparative example PT7007 and inventive example 3. In addition, a vertical line, as shown in this figure, indicates the lower integration limit to determine "w." Thus, "w" effectively is the area under the curve to the right of this vertical line.

In equation form, the parameters are determined as follows. Numerical integration from the table of "log M" and "dw/dlog M" is typically done with the trapezoidal rule:

$$Mw(\text{abs}) = \int_{-\infty}^{\infty} M \frac{dw}{d\log M} d\log M,$$

$$Mn(\text{abs}) = \frac{1}{\int_{-\infty}^{\infty} \frac{1}{M} \frac{dw}{d\log M} d\log M}, \text{ and}$$

$$w = \int_{6}^{\infty} \frac{dw}{d\log M} d\log M.$$

Rheological G'

The sample used in the G' measurement was prepared from a compression molding plaque. A piece of aluminum foil was placed on a backplate, and a template or mold was placed on top of the backplate. Approximately 12 grams of resin was placed in the mold, and a second piece of aluminum foil was placed over the resin and mold. A second backplate was then placed on top of the aluminum foil. The total ensemble was put into a compression molding press, which was run at the following conditions: 3 min at 150° C., at 10 bar pressure, followed by 1 min at 150° C., at 150 bar, followed by a "1.5 min" quench cooling to room temperature, at 150 bar. A 25 mm disk was stamped out of the compression-molded plaque. The thickness of this disk was approximately 2.0 mm The rheology measurement to determine G' was done in a nitrogen environment, at 170° C., and a strain of 10%. The stamped-out disk was placed between the two "25 mm" parallel plates located in an ARES-1 (Rheometrics SC) rheometer oven, which was preheated, for at least 30 minutes, at 170° C., and the gap of the "25 mm" parallel plates was slowly reduced to 1.65 mm. The sample was then allowed to remain for exactly 5 minutes at these conditions. The oven was then opened, the excess sample was carefully trimmed around the edge of the plates, and the oven was closed. The storage modulus and loss modulus of the sample were measured via a small amplitude, oscillatory shear, according to a decreasing frequency sweep from 100 to 0.1 rad/s (when able to obtain a G" value lower than 500 Pa at 0.1 rad/s), or from 100 to 0.01 rad/s. For each frequency sweep, 10 points (logarithmically spaced) per frequency decade were used.

The data were plotted (G' (Y-axis) versus G" (X-axis)) on a log-log scale. The Y-axis scale covered the range from 10 to 1000 Pa, while the X-axis scale covered the range from 100 to 1000 Pa. The Orchestrator software was used to select the data in the region where G" was between 200 and 800 Pa (or using at least 4 data points). The data were fit to a log polynomial model using the fit equation Y=C1+C2 ln(x). Using the Orchestrator software, G' at G" equal to 500 Pa was determined by interpolation.

In some cases, the G' (at a G" of 500 Pa) was determined from test temperatures of 150° C. and 190° C. The value at 170° C. was calculated from a linear interpolation from the values at these two temperatures.

Standard Method for Hexane Extractable

Polymer pellets (from the polymerization, pelletization process without further modification approximately 2.2 grams of pellets pressed into a film) were pressed in a Carver Press, at a thickness of 3.0-4.0 mils. The pellets were pressed at 190° C., for three minutes, at 3,000 $lb_f$, and then at 190° C., for three minutes, at 40,000 $lb_f$. Non-residue gloves (PIP* CleanTeam* Cotton Lisle Inspection Gloves, Part Number: 97-501) were worn, so as to not contaminate films with residual oils from the hands of the operator. Films were cut into "1 inch×1 inch" squares, and weighed. Enough film samples were used, such that "2.5 g" of film samples were used for each extraction. The films were then extracted for two hours, in a hexane vessel containing about 1000 ml of hexane, at "49.5±0.5° C." in a heated water bath. The hexane used was an isomeric "hexanes" mixture (for example, Hexanes (Optima), Fisher Chemical, High purity mobile phase for HPLC and/or extraction solvent for GC applications, 99.9% min by GC). After two hours, the films were removed, rinsed in clean hexane, initially dried with nitrogen and then further dried in a vacuum oven (80±5° C.) at full vacuum (ISOTEMP Vacuum Oven, Model 281A at approximately 30 inches Hg) for two hours. The films were then placed in a desiccator, and allowed to cool to room temperature for a minimum of one hour. The films were then reweighed, and the amount of mass loss due to extraction in hexane was calculated.

Standard Method for Chloroform Extractable

A FOSS SOXTEC Avanti 2050 automatic extraction system, with control unit 2050 and drive unit 2050, was used for chloroform extraction. Chloroform with a purity of at least 99% (J. T. Baker code 7386 or equivalent) was used. An amount of 6-8 grams of pellets (from the polymerization pelletization without further modification; 25-45 pellets per gram) was weighed into a crucible; 180 mL of solvent (chloroform) was added, and the sample was boiled at a set temperature of 180° C. for a boil time of 3.5 hours. The pellets were submersed in the boiling solvent during the boiling time. After the boiling step, a rinsing step of 3.5 hours was used. The rinse solvent was chloroform. The samples were lifted above the surface of the boiling solvent, which condensed and refluxed back into the crucible; in the mean time, the pellet sample was rinsed at a rate of about 180 drops per minute. After the rinsing step, the chloroform solvent in the crucible was partly recovered by the instrument for further use. The solvent remaining in the crucible was evaporated, and the polymer extract was retained and measured.

EXPERIMENTAL

Example C

Comparative

The polymerization was carried out in tubular reactor with three reaction zones. In each reaction zone, pressurized water was used for cooling and/or heating the reaction medium, by circulating this water through the jacket of the reactor. The inlet-pressure was 2100 bar, and the pressure drop over the whole tubular reactor system was about 300 bars Each reaction zone had one inlet and one outlet. Each inlet stream consisted of the outlet stream from the previous reaction zone and/or an added ethylene-rich feed stream. The ethylene was supplied according to a specification, which allowed a trace amount (maximum of 5 mol ppm) of acetylene in the ethylene. Thus, the maximum, potential amount of incorporated acetylene in the polymer is less than, or equal to, 16 mole ppm, based on the total moles of monomeric units in the ethylene-based polymer (see conversion level in Table 3). The non-converted ethylene, and other gaseous components in the reactor outlet, were recycled through a high pressure and a low pressure recycles, and were compressed and distributed through a booster, a primary and a hyper (secondary) compressors, according flow scheme shown in FIG. 1. Organic peroxides (see Table 3) were fed into each reaction zone. Propionaldehyde (PA) was used as a chain transfer agent, and it was present in each reaction zone inlet originated from the low pressure and high pressure recycle flows (#13 and #15), as well as from freshly injected CTA make-up stream #7 and/or stream #6. In this comparative example, the weight ratio between the "CTA make up" streams #7 and #6 was 0.25.

After reaching the first peak temperature (maximum temperature) in reaction zone 1, the reaction medium was cooled with the aid of the pressurized water. At the outlet of reaction zone 1, the reaction medium was further cooled by injecting a fresh, cold, ethylene-rich feed stream (#20), and the reaction was re-initiated by feeding an organic peroxide. This process was repeated at the end of the second reaction zone to enable further polymerization in the third reaction zone. The polymer was extruded and pelletized (about 30 pellets per gram), using a single screw extruder at a melt temperature around 230-250° C. The weight ratio of the ethylene-rich feed streams to the three reaction zones was 1.00:0.75:0.25. The R2 and R3 values were each 0.45. The R values are calculated according to U.S. Provisional Application No. 61/548,996 (International Application No. PCT/US12/059469). Rn (n=reaction zone number, n>1) is the ratio of "mass fraction of fresh ethylene fed to the first reaction zone (RZ1)" to "mass fraction of fresh ethylene fed to the nth reaction zone (RZn)" is (Rn=RZ1/RZn). The internal process velocity was approximately 12.5, 9 and 11 m/sec for respectively the $1^{st}$, $2^{nd}$ and $3^{rd}$ reaction zone. Additional information can be found in Tables 2 and 3.

Example E

Comparative

The polymerization was carried out in tubular reactor with three reaction zones, as discussed above. All process conditions are the same as for Example C, except the initiator composition was changed. In this example, additional TETMP was used as initiator. The R2 and R3 values were each 0.46.

Example F

Comparative

Figure 2:
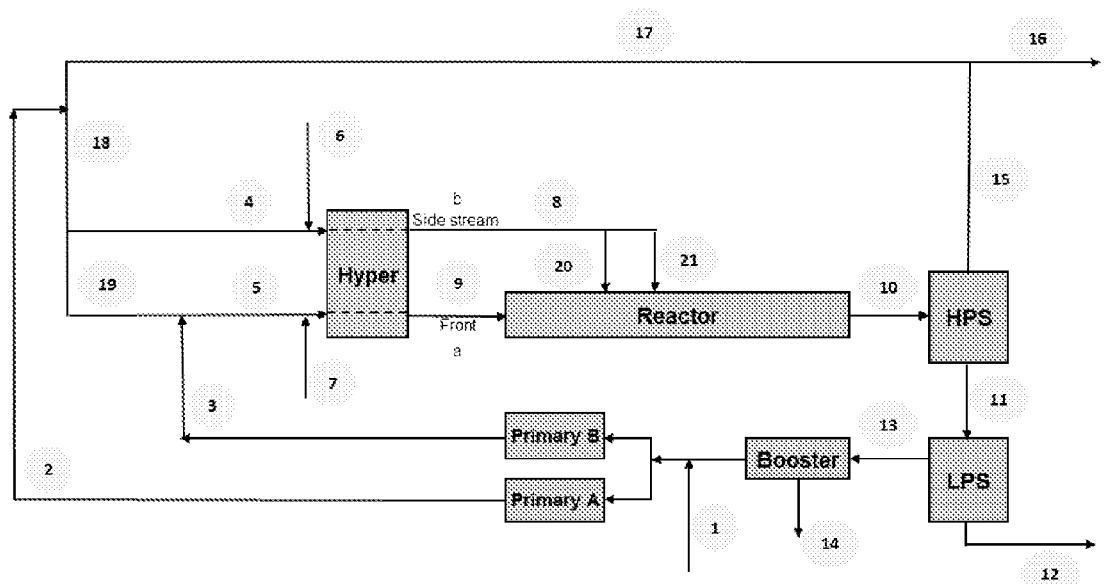
FIG. 2 is a schematic of a polymerization flow scheme.
Figure 3:
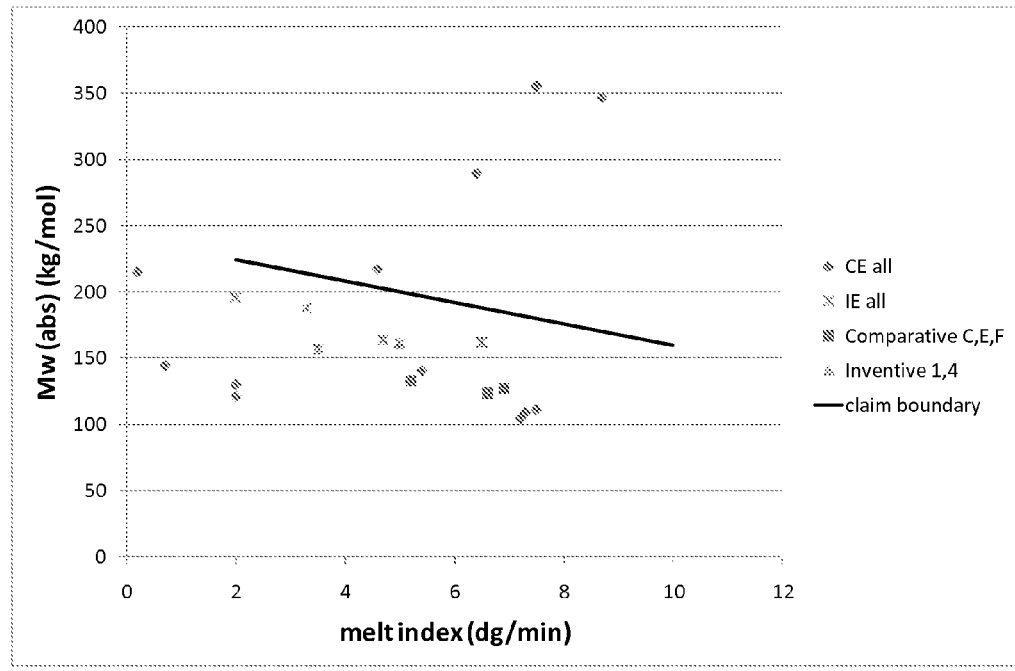
FIG. 3 depicts "Mw(abs) versus melt index (I2)" for comparative and inventive polymers.
Figure 4:
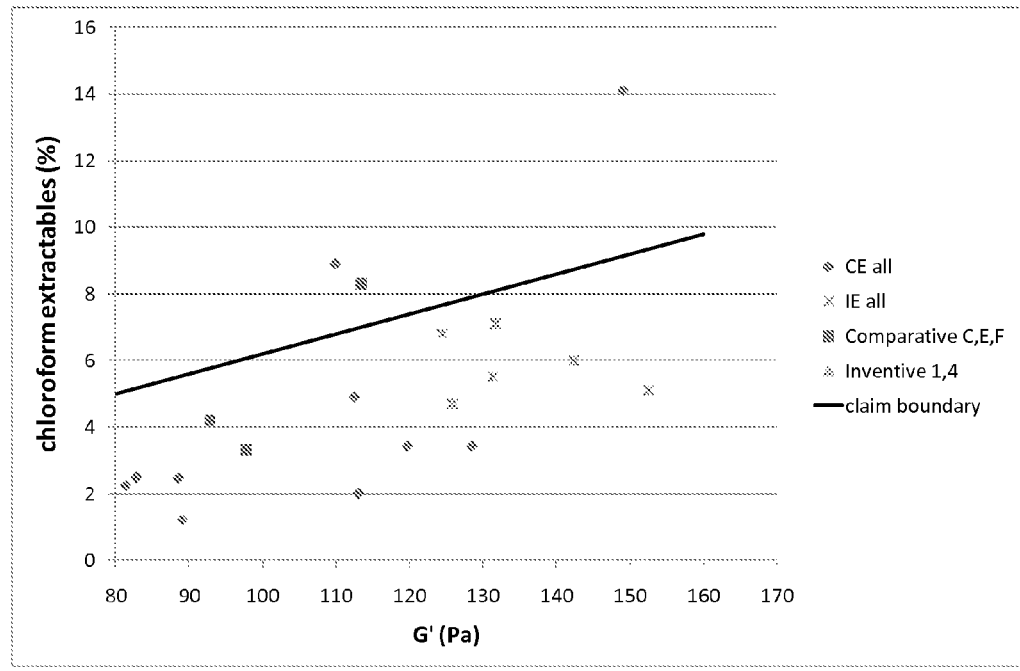
FIG. 4 depicts "chloroform extractable versus (G')" for comparative and inventive polymers.
Figure 5:
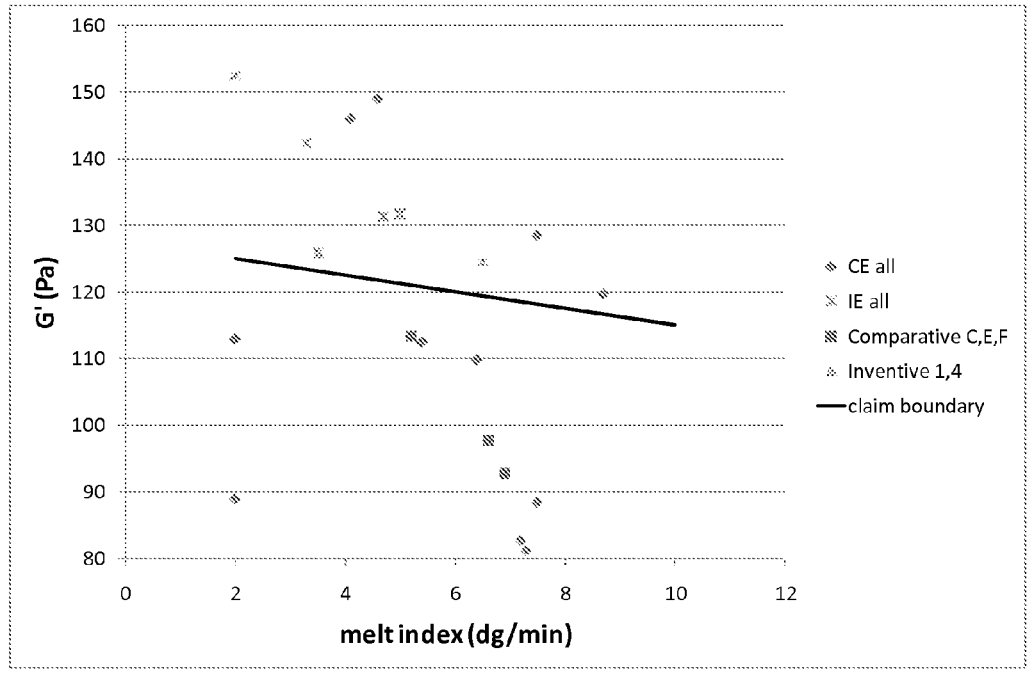
FIG. 5 depicts "(G') versus melt index (I2)" for comparative and inventive polymers.

The polymerization was carried out in tubular reactor with three reaction zones, as discussed above. The non-converted ethylene, and other gaseous components in the reactor outlet, were recycled through the high pressure and low pressure recycles, and were compressed and distributed through the booster, primary and hyper (secondary) compressors according flow scheme 2 as shown in FIG. 2.

In each reaction zone, the polymerization was initiated with organic peroxides as described in Comparative Example E. After reaching the first peak temperature in reaction zone 1, the reaction medium was cooled down with pressurized water. At the outlet of the first reaction zone, the reaction medium was further cooled by injecting a fresh, cold ethylene-rich feed stream (#20), and the reaction was initiated again by feeding organic peroxide into the reaction zone. This process was repeated at the end of the second reaction zone, to enable further polymerization in the third reaction zone. The peak temperatures were 330° C./319° C./306° C., respectively.

The weight ratio of the ethylene-rich feed streams to the three reaction zones was 1.00:0.75:0.25. For the chain transfer agent, propylene was used, and it was present in each reactor inlet originating from the low and high pressure recycle flows (#13 and #15), as well as from freshly injected CTA make-up stream #7 and/or stream #6. The supplied propylene contained a trace amount of (sum maximum of 5 mol ppm) propadiene and methylacetylene in the propylene. Thus, the maximum, potential amount of incorporated propadiene and/or methylacetylene in the polymer is far less than 1 mole ppm.

In this comparative example, the weight ratio of the CTA make-up streams #7 and #6 was 1.00. Due to the higher peak temperature conditions, the CTA consumption was significantly reduced versus Example C. The R2 and R3 values were each 2.22. Additional information can be found in Tables 2 and 3.

See polymerization conditions for Examples A, B and G in Tables 2 and 3.

Example 1

Inventive

The polymerization was run according description for Example F above, with the following changes. Last peak temperature was increased to 310° C., and CTA acetone was used, and the melt index was lowered to 3.5 dg/min. The R2 and R3 values were each 2.21.

Example 3

Inventive

The polymerization was run according to the above description for Example 1 with the following changes. In this inventive example, the peak temperatures were adjusted to 337/330/310° C., respectively and the melt index was increased to 5 dg/min. The R2 and R3 values were each 2.19.

Initiators are listed in Table 1. Other polymerizations were run similar to the polymerizations above, with the changes noted in Tables 2 and 3. The summaries of the polymerization conditions are listed in Tables 2 and 3.

The inventive (IE) and comparative (CE) ethylene-based polymers, and some commercial polymers, are listed in Tables 4, 5A and 5B below.

See polymerization conditions for Examples 2 and 4-6 in Tables 2 and 3.

TABLE 1

| Initiators | |
|---|---|
| Initiator | Abbreviation |
| tert-Butyl peroxy-2-ethyl hexanoate | TBPO |
| Di-tert-butyl peroxide | DTBP |
| 3,6,9-triethyl 3,6,9-trimethyl 1,4,7-peroxonane | TETMP |

TABLE 2

Pressure and temperature conditions of comparative and inventive examples

| LDPE Exs. | Type | Inlet-pressure/ bar | Start-temp./° C. | reinitiation temp. 2nd zone/° C. | reinitiation temp. 3rd zone/° C. | 1st Peak temp./° C. | 2nd Peak temp./° C. | 3rd Peak temp./° C. |
|---|---|---|---|---|---|---|---|---|
| A | Comp. | 2100 | 140 | 148 | 224 | 326 | 319 | 281 |
| B | Comp. | 2100 | 140 | 148 | 225 | 325 | 319 | 296 |
| C | Comp. | 2100 | 140 | 148 | 226 | 325 | 319 | 310 |
| D | Comp. | 2100 | 140 | 148 | 222 | 324 | 318 | 294 |
| E | Comp. | 2100 | 140 | 150 | 228 | 323 | 319 | 310 |
| F | Comp. | 2100 | 140 | 151 | 231 | 330 | 319 | 306 |
| G | Comp. | 2100 | 140 | 152 | 230 | 330 | 321 | 307 |
| 1 | Inv. | 2100 | 140 | 154 | 234 | 330 | 321 | 310 |
| 2 | Inv. | 2100 | 140 | 155 | 242 | 335 | 331 | 312 |
| 3 | Inv. | 2100 | 140 | 157 | 246 | 337 | 330 | 310 |
| 4 | Inv. | 2100 | 140 | 159 | 246 | 330 | 330 | 312 |
| 5 | Inv. | 2100 | 140 | 159 | 241 | 331 | 326 | 311 |
| 6 | Inv. | 2100 | 140 | 158 | 245 | 338 | 333 | 303 |

TABLE 3

Additional information of the comparative and inventive examples

| LDPE Exs. | Peroxides | CTA | MI dg/min$^{-1}$ | R2 and R3 Value* | Conversion % |
|---|---|---|---|---|---|
| A | TBPO/DTBP | PA | 7.3 | 0.44 | 28.8 |
| B | TBPO/DTBP | PA | 7.5 | 0.45 | 30.4 |
| C | TBPO/DTBP | PA | 6.6 | 0.45 | 32.0 |
| D | TBPO/DTBP | PA | 7.2 | 0.44 | 30.1 |
| E | TBPO/DTBP/TETMP | PA | 6.9 | 0.46 | 32.7 |
| F | TBPO/DTBP/TETMP | Propylene | 5.2 | 2.22 | 31.3 |
| G | TBPO/DTBP/TETMP | Acetone | 5.4 | 2.21 | 31.8 |
| 1 | TBPO/DTBP/TETMP | Acetone | 3.5 | 2.21 | 31.8 |
| 2 | TBPO/DTBP/TETMP | Acetone | 6.5 | 2.16 | 33.7 |
| 3 | TBPO/DTBP/TETMP | Acetone | 5.0 | 2.19 | 32.4 |
| 4 | TBPO/DTBP/TETMP | Acetone | 3.3 | 2.16 | 33.6 |
| 5 | TBPO/DTBP/TETMP | Acetone | 2.0 | 2.16 | 33.4 |
| 6 | TBPO/DTBP/TETMP | Acetone | 4.7 | 2.18 | 32.8 |

*When R2 and R3 are each greater than 1, the flow scheme in FIG. 2 was used. When R2 and R3 are each less than 1, the flow scheme in FIG. 1 was used.

TABLE 4

Inventive and Comparative Polymers

| LDPE | Type** | I2 (dg/min) | Density (g/cc) | Mw(abs) (kg/mol) | Mw(abs)/ Mn(abs) | G' (Pa) at 170° C. and G" = 500 Pa | Hexane Extr. (wt %) | Chloroform Extr. (wt %) |
|---|---|---|---|---|---|---|---|---|
| PG7004*$^f$ | CE, AC | 4.1 | 0.9215 | >300 | >20 | 146 | | |
| PT7007*$^f$ | CE, AC | 7.5 | 0.9174 | 355 | 26.1 | 129 | 1.9 | 3.4 |
| PT7009*$^f$ | CE, AC | 8.7 | 0.9188 | 346 | 23.5 | 120 | 1.8 | 3.4 |
| LDPE 160C*** | CE, tub | 6.4 | 0.9175 | 289 | 25.9 | 110 | 4.8 | 8.9 |
| (SABIC nExCoat 5)* | CE, tub X-Link | 4.6 | 0.9170 | 217 | | 149 | 3.3 | 14.1 |
| LD150E*$^f$ | CE, tub | 0.2 | 0.9211 | 215 | 9.6 | — | <1.5 | 1.8 |
| LD310E*$^f$ | CE, tub | 0.7 | 0.9231 | 144 | 8.3 | — | <1.5 | 1.6 |
| LD410E*$^f$ | CE, tub | 2.0 | 0.9242 | 121 | 6.7 | 89$^s$ | <1.5 | 1.2 |
| LD450E*$^f$ | CE, tub | 2.0 | 0.9231 | 130 | 7.8 | 113$^s$ | <1.5 | 2.0 |
| A | CE, tub | 7.3 | 0.9228 | 109 | 8.5 | 81 | 1.7 | 2.2 |
| B | CE, tub | 7.5 | 0.9220 | 111 | 8.3 | 89 | 1.9 | 2.5 |
| C | CE, tub | 6.6 | 0.9213 | 124 | 10.2 | 98 | 2.3 | 3.3 |
| D | CE, tub | 7.2 | 0.9221 | 104 | 8.7 | 83 | 1.8 | 2.5 |
| E | CE, tub | 6.9 | 0.9209 | 127 | 8.9 | 93 | 2.5 | 4.2 |
| F | CE, tub | 5.2 | 0.9177 | 133 | 11.6 | 113 | 3.5 | 8.3 |
| G | CE, tub | 5.4 | 0.9207 | 140 | 11.1 | 113 | 2.9 | 4.9 |
| 1 | IE, tub | 3.5 | 0.9196 | 157 | 10.7 | 126 | 3.0 | 4.7 |
| 2 | IE, tub | 6.5 | 0.9184 | 162 | 13.6 | 125 | 4.0 | 6.8 |
| 3 | IE, tub | 5.0 | 0.9188 | 161 | 14.3 | 132 | 3.8 | 7.1 |
| 4 | IE, tub | 3.3 | 0.9191 | 188 | 14.4 | 142 | 3.6 | 6.0 |
| 5 | IE, tub | 2.0 | 0.9193 | 196 | 14.3 | 153 | 3.0 | 5.1 |
| 6 | IE, tub | 4.7 | 0.9185 | 164 | 13.8 | 131 | 3.6 | 5.5 |

*Commercial Polymers
**CE: Comparative Example; IE: Inventive Example; AC: Autoclave-based; tub X-Link: Tubular Crosslinked; tub: Tubular.
***Former Dow LDPE 160C
$^s$"170° C. data" is interpolated from 150° C. and 190° C. data.
$^f$Available from The Dow Chemical Company.

TABLE 5A

Comparative Polymers

| LDPE | I2 (dg/min) | Mw(abs) (kg/mol) | G' (Pa) | Chloroform Extr. (wt %) | w | $A + B(I2)^a$ (kg/mol) | $E + FG'^b$ (wt %) | $C + D(I2)^c$ (Pa) | $I + J(I2)^d$ |
|---|---|---|---|---|---|---|---|---|---|
| PG7004 | 4.1 | >300 | 146 | — | >0.09 | 207 | 9.0 | 122 | 0.064 |
| PT7007 | 7.5 | 355 | 129 | 3.4 | 0.097 | 180 | 7.9 | 118 | 0.050 |
| PT7009 | 8.7 | 346 | 120 | 3.4 | 0.094 | 170 | 7.4 | 117 | 0.045 |
| LDPE 160C | 6.4 | 289 | 110 | 8.9 | 0.052 | 189 | 6.8 | 120 | 0.054 |
| SABIC nExCoat 5 | 4.6 | 217 | 149 | 14.1 | 0.039 | 203 | 9.1 | 122 | 0.062 |
| LD150E | 0.2 | 215 | — | 1.8 | 0.043 | 238 | — | 127 | 0.079 |
| LD310E | 0.7 | 144 | — | 1.6 | 0.018 | 234 | — | 127 | 0.077 |
| LD410E | 2.0 | 121 | 89$^s$ | 1.2 | 0.009 | 224 | — | 125 | 0.072 |
| LD450E | 2.0 | 130 | 113$^s$ | 2.0 | 0.014 | 224 | — | 125 | 0.072 |
| A | 7.3 | 109 | 81 | 2.2 | 0.008 | 182 | 5.1 | 118 | 0.051 |
| B | 7.5 | 111 | 89 | 2.5 | 0.008 | 180 | 5.5 | 118 | 0.050 |
| C | 6.6 | 124 | 98 | 3.3 | 0.005 | 187 | 6.1 | 119 | 0.054 |
| D | 7.2 | 104 | 83 | 2.5 | 0.007 | 182 | 5.2 | 119 | 0.051 |
| E | 6.9 | 127 | 93 | 4.2 | 0.010 | 185 | 5.8 | 119 | 0.052 |
| F | 5.2 | 133 | 113 | 8.3 | 0.014 | 198 | 7.0 | 121 | 0.059 |
| G | 5.4 | 140 | 113 | 4.9 | 0.018 | 197 | 7.0 | 121 | 0.058 |

$^a$Mw(abs) ≤ A + B(I2), where A = 2.40 × 10$^5$ g/mole, and B = –8.00 × 10$^3$ (g/mole)/(dg/min).
$^b$a chloroform extractable (Clext) ≤ E + FG', where E = 0.20 wt %, and F = 0.060 wt % Pa.
$^c$G' ≥ C + D(I2), where C = 127.5 Pa, and D = –1.25 Pa/(dg/min).
$^d$w ≤ I + J(I2), where I = 0.080 (–), and J = –4.00 × 10$^{-3}$ 1/(dg/min).
$^s$"170° C. data" is interpolated from 150° C. and 190° C. data.

TABLE 5B

Inventive Polymers

| LDPE | I2 (dg/min) | Mw(abs) (kg/mol) | G' (Pa) | Chloroform Extr. (wt %) | w | $A + B(I2)^a$ (kg/mol) | $E + FG'^b$ (wt %) | $C + D(I2)^c$ (Pa) | $I + J(I2)^d$ |
|---|---|---|---|---|---|---|---|---|---|
| 1 | 3.5 | 157 | 126 | 4.7 | 0.024 | 212 | 7.8 | 123 | 0.066 |
| 2 | 6.5 | 162 | 125 | 6.8 | 0.024 | 188 | 7.7 | 119 | 0.054 |
| 3 | 5.0 | 161 | 132 | 7.1 | 0.026 | 200 | 8.1 | 121 | 0.060 |
| 4 | 3.3 | 188 | 142 | 6.0 | 0.036 | 214 | 8.7 | 123 | 0.067 |
| 5 | 2.0 | 196 | 153 | 5.1 | 0.037 | 224 | 9.4 | 125 | 0.072 |
| 6 | 4.7 | 164 | 131 | 5.5 | 0.026 | 202 | 8.1 | 122 | 0.061 |

$^a$Mw(abs) ≤ A + B(I2), where A = 2.40 × 10$^5$ g/mole, and B = –8.00 × 10$^3$ (g/mole)/(dg/min).
$^b$a chloroform extractable (Clext) ≤ E + FG', where E = 0.20 wt %, and F = 0.060 wt % Pa.
$^c$G' ≥ C + D(I2), where C = 127.5 Pa, and D = –1.25 Pa/(dg/min).
$^d$w ≤ I + J(I2), where I = 0.080 (–), and J = –4.00 × 10$^{-3}$ 1/(dg/min).

The inventive examples have the claimed balance of polymer properties. Broadened Mw(abs)/Mn(abs), high G', and low extractables, for example, low chloroform extractables, achieved at moderate Mw(abs), as compared to the comparative examples.

Comparative examples, CE PG7004, PT7007, and PT7009, are autoclave LDPE. These examples have low extractables, but much higher Mw(abs) for the same G' level as compared to the inventive samples. For example, compare PT7007 with inventive example 3; and PT7004 with inventive example 4.

Comparative examples LDPE 160C and SABIC NEXCOAT CE (modified with a cross linking agent) are tubular resins that do have high G' values, but are accompanied with high chloroform extractables, as compared to the inventive examples. Both also have significantly higher Mw(abs) than the inventive examples.

Comparative examples LD410E and LD450E are for high clarity film (narrow MWD) and foam (broader MWD) applications, with low extractables. Comparative examples LD150E and LD310E are good film resins with low extractables. The rheological properties of the comparative examples are not suitable for extrusion coating applications. The inventive examples have the desired balance between G' value and melt index (I2), and are well suited for extrusion coating applications.

Comparative examples A through F are broader tubular resins as compared to the comparative LD410E and LD450E resins mentioned above. The G' value is still lower than what was reach with the inventive examples.

Comparative examples C and E have been made under similar polymerization conditions, except of the additional use of TETMP as high temperature peroxide in comparative example E. TETMP is a multi functional peroxide. The additional use of a multi function initiator did not lead to broadening of Mw(abs)/Mn(abs), or improved coating performance, as shown in Tables 4-6 (see also DD120200, which teaches the use of multifunctional peroxides to broaden MWD). These tables indicate similar performance, and the small differences are within measurement accuracy.

Comparative examples F and G have been made under similar polymerization conditions, except propylene was used in F as CTA, and acetone was used in G as CTA. The data shows that the coating performance is very slightly improved by the use of propylene; however the extractable levels are significantly higher (see also U.S. Pat. No. 3,657,212 which teaches propylene as one of the two preferred CTA's). Furthermore, comparative example G is lacking the desired G' level. Inventive examples 1 to 6 have the required G' level. The G' values of these samples were improved by raising the polymerization temperatures.

For achieving broad MWD resins, with low extractables, and the required G' value the polymerization conditions need to be optimized and balanced with other product properties like melt-index, density and extractable level Important process parameters are the level and the differentiation in maximum polymerization temperatures along the reaction zones, the pressure level, and the type and distribution of CTA over the reactor.

Extrusion Coating

Monolayer extrusion coatings were performed at a set temperature profile represented following temperature settings: Extruder Barrel—200° C./250° C./280° C./290° C./290° C./290° C.; Flange/Adapter/Piping—290° C. (6 zones); and Die—290° C.×10 Zones.

The LDPE resins were extruded on a "3.5 inch" diameter screw, with a length over diameter (L/D) ratio of 32, onto 70 g/m² Kraft paper in an amount (coating weight) of 25 g/m². Melt pressure and melt temperature were recorded with thermocouples placed in the adapter. The melt was delivered through a Davis Standard/Er-We-Pa flex lip edge bead reduction die, Series 510A, nominally set to a die gap of 0.7 mm. The melt drawing and application of the melt vertically onto the moving substrate was performed at an air gap of 250 mm and a nip off-set of 15 mm, towards the pressure roll. The melt was applied onto the moving substrate in the laminator nip, which is the contact point of the pressure roll, with a rubber surface layer contacting the "water cooled" chill roll with a matte surface finish, and maintained at a temperature of 15° C. to 20° C. The air gap is defined as the vertical distance between the die lip and the laminator nip. The nip off-set is defined as the horizontal off-set of the die lip position relative to the laminator nip.

A line speed of 300 m/min was used to determine "the neck-in." For "draw-down" determination, varying (gradually increasing) line speed was used, at a coating weight of 15 g/m². "Draw down" is defined as the maximum line speed attainable before web breakage occurs. "Neck-in" is the difference between the final width of the web and the die width at fixed line speed (300 m/min) Lower "neck-in" and higher "draw down" are both very desirable. Lower "neck-in" indicates better dimensional stability of the web, which, in turn, provides better control of the coating onto the substrate. Higher "draw down" indicates higher line speed, which, in turn, means better productivity. Results are shown in Table 6.

TABLE 6

Neck-In and Draw-Down

| Sample | Type | Neck-in 290° C.; 25 g/m²; 300 m/min (mm) | Draw-down 290° C.; 15 g/m² (m/min) |
|---|---|---|---|
| PG7004 | CE, AC | 88 | 115 |
| PT7007 | CE, AC | 92 | 190 |
| PT7009 | CE, AC | 109 | 240 |
| SABIC NEXCOAT | CE, tub EC | 113 | 322 |
| A | CE, tub | 251 | 350 |
| B | CE, tub | 227 | 485 |
| C | CE, tub | 187 | 600 |
| D | CE, tub | 260 | 250 |
| E | CE, tub | 183 | 550 |
| F | CE, tub | 160 | 300 |
| G | CE, tub | 170 | 250 |
| 1 | IE, tub | 121 | 200 |
| 2 | IE, tub | 134 | 284 |
| 3 | IE, tub | 117 | 350 |
| 4 | IE, tub | 109 | 150 |
| 5 | IE, tub | 122 | 300 |

Table 6 shows "neck-in" and "draw down." It is most critical to consider "neck-in." The autoclave-based PG7004, PT7007, and PT7009 have low "neck-in," and are commercially applied in extrusion coating applications. Typically it is difficult to achieve low "neck-in" with tubular LDPE. When considering comparative examples A-G, Table 6 shows much higher "neck-in" than the AC-based (Autoclave-based) CE. In contrast, IE 1-5 show a significant improvement (lower) "neck-in," and a final result close to the AC-based benchmarks. The "draw down" of these inventive examples is also matching, or even slightly higher than, the drawdown of the AC-based CEs. The inventive examples provide good extrusion coatings even at lower Mw(abs), as compared to the AC-based examples. Also, the inventive examples were observed to have a significantly better web appearance (transparency and gloss) than the autoclave-based references. The inventive examples can be made on a tubular reactor train, with improved conversion levels, and lower energy input, as compared to autoclave processes. Furthermore, the inventive polymers make it possible to produce high clarity film and extrusion coatings on one tubular reactor train. For high clarity film applications, gel levels should be extremely low. To achieve low gel levels, a crosslinking agent and/or a comonomer with crosslinking capability are typically not desired in the formation of the polymer. It has been discovered that the inventive ethylene-based polymers have improved elasticity and coating performance, without an excessive presence of high molecular weight fraction. The combination of I2, Mw(abs) and G' provide for high elasticity at moderate Mw(abs).

The invention claimed is:

1. An ethylene-based polymer comprising the following properties:
   a) a melt index (I2)≥2.0 dg/min;
   b) a Mw(abs) versus I2 relationship: Mw (abs)<A+B(I2), where A=2.40×10⁵ g/mole, and B=−8.00×10³ (g/mole)/(dg/min);
   c) a G'(at G"=500 Pa, 170° C.) versus I2 relationship: G'≥C+D(I2), where C=127.5 Pa, and D=−1.25 Pa/(dg/min).

2. An ethylene-based polymer comprising the following properties:
   a) a melt index (I2)≥2.0 dg/min;
   b) a G' versus I2 relationship: G'(at G"=500 Pa, 170° C.)>C+D(I2), where C=127.5 Pa, and D=−1.25 Pa/(dg/min)
   c) a chloroform extractable (Clext) versus G' relationship: Clext≤E+FG', where E=0.20 wt %, and F=0.060 wt %/Pa; and
   d) a "weight fraction (w) of molecular weight greater than 10⁶ g/mole, based on the total weight of polymer, and as determined by GPC(abs)," that meets the following relationship: w<I+J(I2), where I=0.080, and J=−4.00×10⁻³ min/dg.

3. The ethylene-based polymer of claim 1, wherein the polymer further comprises: d) a chloroform extractable (Clext) versus G' relationship: Clext≤E+FG', where E=0.20 wt %, and F=0.060 wt %/Pa.

4. The ethylene-based polymer of claim 1, wherein the ethylene-based polymer is selected from a polyethylene homopolymer or an ethylene-based interpolymer.

5. The ethylene-based polymer of claim 1, wherein the ethylene-based polymer is selected from a polyethylene homopolymer or an ethylene-based copolymer; and wherein the comonomer of the ethylene-based copolymer is selected from vinyl acetate, an alkyl acrylate, CO, acrylic acid, a carboxylic acid-containing comonomer, or a mono olefin.

6. The ethylene-based polymer of claim 5, wherein the comonomer is present in an amount from 0.5 to 10 wt % comonomer, based on weight of copolymer.

7. The ethylene-based polymer of claim 1, wherein the polymer comprises less than 30 mole ppm of a crosslinking agent and/or a comonomer with crosslinking capability, based on total moles of monomer units in the ethylene-based polymer.

8. The ethylene-based polymer of claim 1, wherein the polymer has a hexane extractable level ≤4.5 wt %, based on weight of polymer.

9. The ethylene-based polymer of claim 1, wherein the polymer is a polyethylene homopolymer.

10. The ethylene-based polymer of claim 1, wherein the polymer is an ethylene-based copolymer; and wherein the comonomer of the ethylene-based copolymer is selected from vinyl acetate, an alkyl acrylate, CO, acrylic acid, a carboxylic acid-containing comonomer, or a mono olefin.

11. The ethylene-based polymer of claim 1, wherein the polymer has a weight average molecular weight Mw(abs)≥G+H(I2), where G=$1.60\times10^5$ g/mole, and H=$-8.00\times10^3$ (g/mole)/(dg/min).

12. The ethylene-based polymer of claim 1, wherein the polymer has an I2≤20 g/10 min.

13. A composition comprising the ethylene-based polymer of claim 1.

14. The composition of claim 8, wherein the composition has a "neck-in" value ≤150 mm, at a temperature=290° C., a coating weight=25 g/m² and a line speed=300 m/min.

15. An article comprising at least one component formed from the composition of claim 13.

16. The article of claim 15, wherein the article is an extrusion coating or a film.

* * * * *